Sept. 29, 1931.    H. H. HARNSBERGER    1,825,521
BOOK SUPPORTING DEVICE
Original Filed June 30, 1922    3 Sheets-Sheet 1
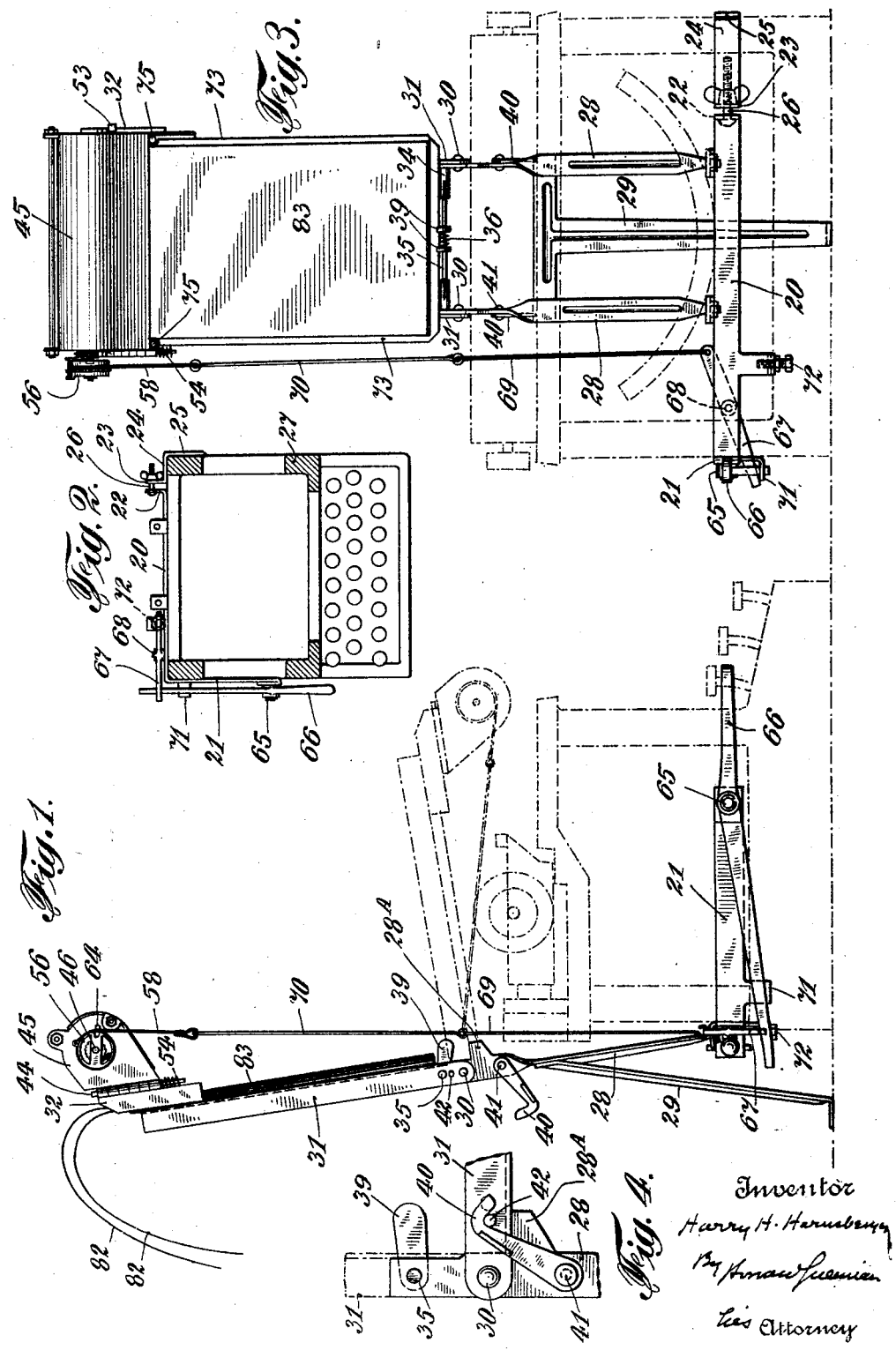

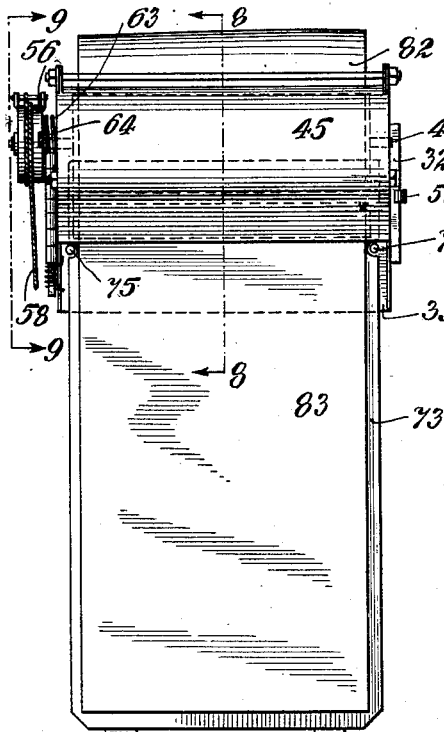
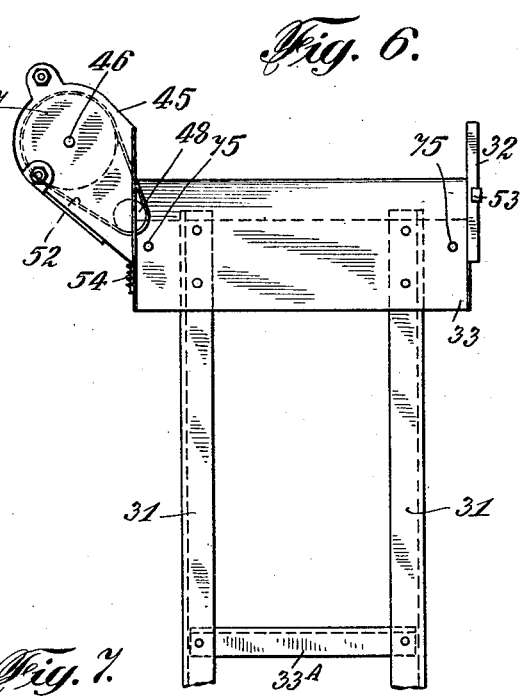
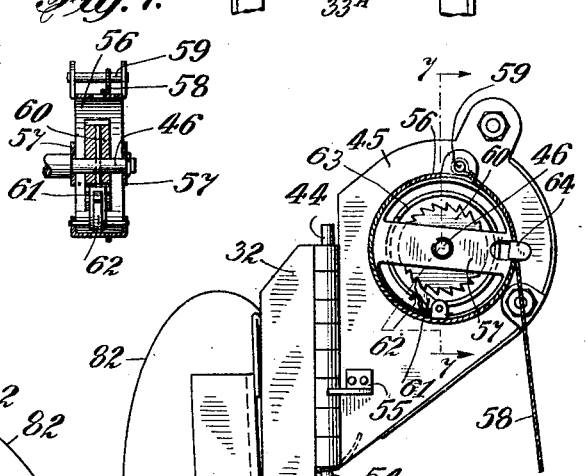
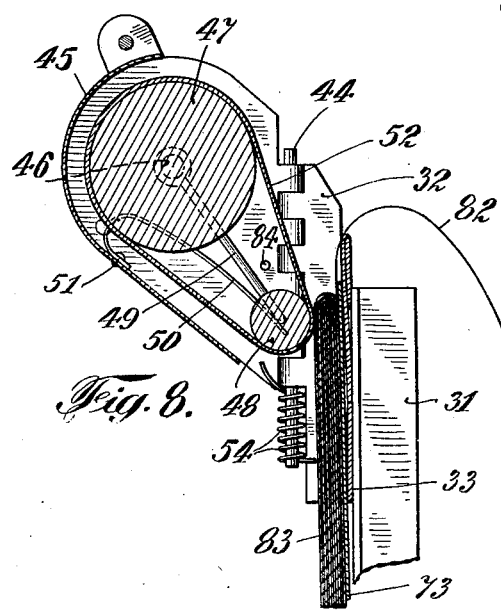

Sept. 29, 1931.          H. H. HARNSBERGER          1,825,521
BOOK SUPPORTING DEVICE
Original Filed June 30, 1922     3 Sheets-Sheet 3
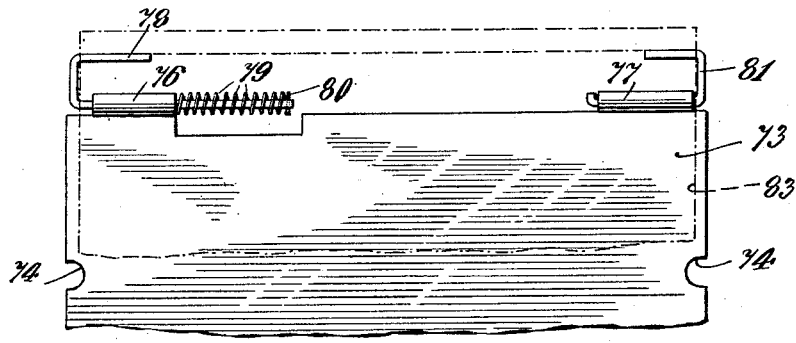
Fig. 10.
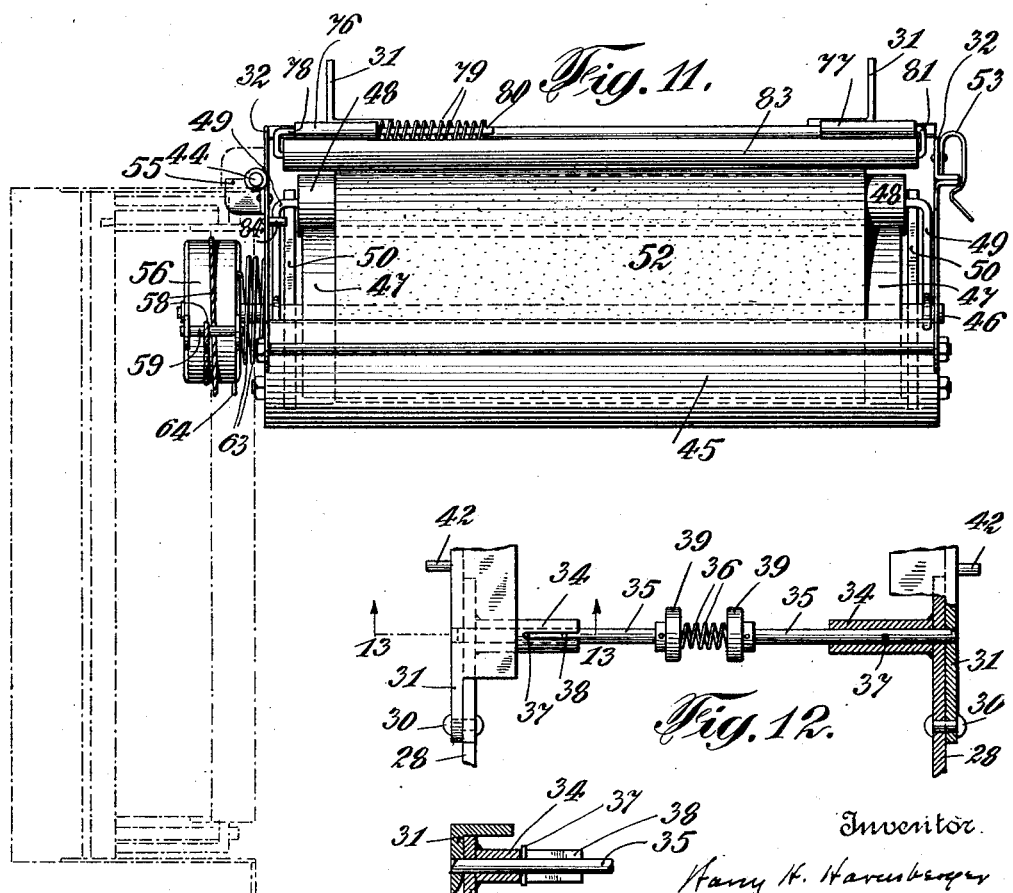
Fig. 11.
Fig. 12.
Fig. 13.
Inventor.
Harry H. Harnsberger
By Horace Freeman
his Attorney Patented Sept. 29, 1931

1,825,521

UNITED STATES PATENT OFFICE

HARRY H. HARNSBERGER, OF CROTON-ON-HUDSON, NEW YORK, ASSIGNOR TO THE TURNAPAGE COMPANY, INC., OF NEW YORK, N. Y., A CORPORATION OF NEW YORK

BOOK SUPPORTING DEVICE

Application filed June 30, 1922, Serial No. 571,914. Renewed February 7, 1931.

My invention relates to book-holding devices and refers particularly to devices of this character suitable for use with typewriting machines.

The usually employed devices whereby a stenographic note-book is held at one side of the typewriting machine has many disadvantages, among which may be mentioned the constant twisting of the typist's neck, due to looking from the book to the machine, the eyestrain, the time consumed in turning the pages and the general inconvenience and injury due to the forced and unnatural position of the typist, all of which have an injurious effect upon the health and comfort of the operator and a corresponding deleterious effect upon the results produced, both as to quality and quantity.

The object of my invention is a device which overcomes all of the above, and other, objectionable features of the book-holder described above.

In a general way, my device presents a means whereby a stenographic note-book may be positioned directly in front of the typist and means whereby the exposed page may be readily and accurately removed from sight and clear of the following page by the simple process of a key depression.

The many advantages of the device of my invention will be evident upon a consideration of my drawings, specification and claims.

In the accompanying drawings illustrating one form of the device of my invention, similar parts are designated by similar numerals.

Figure 1 is a side elevation of one form of my invention carrying a book and attached to a typewriting machine shown in dot-and-dash lines, the book supporting device being shown in erect position in full lines and in folded position in dot-and-dash lines.

Figure 2 is a diagrammatic top plan view of my device, with the book-holding elements removed.

Figure 3 is a front plan view of Figure 1.

Figure 4 is a broken enlarged view of means for maintaining the book-supporting elements in folded position.

Figure 5 is a front plan of the book-supporting elements and leaf-turning mechanism.

Figure 6 is a front plan view of the book-supporting elements, with the leaf-turning mechanism revolved into open position.

Figure 7 is a section through the line 7—7 of Figure 9.

Figure 8 is a section through the line 8—8 of Figure 5.

Figure 9 is a section through the line 9—9 of Figure 5.

Figure 10 is a broken plan view of the book-carrying device.

Figure 11 is a top plan view of the device, the open position of the book-supporting elements being in dot-and-dash lines.

Figure 12 is an enlarged view of the device employed in locking the book-supporting elements in an upright position, partly in section.

Figure 13 is a section through the line 13—13 of Figure 12.

The particular device of my invention, shown in the accompanying drawings, comprises a binding member composed of the element 20 with the angular parts 21 and 22 and the angular members 23, 24, 25, the members 22 and 23 being connected to the wing-nut and threaded member 26. The binding member may therefore be adjusted to any size typewriting machine 27, as shown in Figures 1, 2 and 3.

To the member 20 are attached two upright legs 28, 28, to each of which is attached an inclined brace 29 capable of abutment upon the typewriter table.

Pivotally attached at 30, 30 of the legs 28, 28 are two right-angle uprights 31, 31, to which is attached the plate 33 with two upturned edges 32, 32 and a supporting right-angle member 33A.

The means for allowing of the revolution of the book-support 31, 31 around the pivots 30, 30 and of locking it in upright position are shown particularly in Figures 12 and 13. Each member 28 has an inwardly extended annular bearing 34, within each of which is a slidable locking rod 35, capable of being inserted through aligned openings in 28 and 31, thus locking them in an upright position.

The two rods 35, 35 are normally maintained in locked position by means of the spiral spring 36, the movement of the rods being limited by a pin 37 in each rod slidable through a slot 38 in the bearing 34. Each rod 35 has its outer end bevelled to allow it to enter the hole in the member 31 when the book-support is moved upwardly, the release being caused by pressing the two members 39, 39 toward each other.

The means for locking the book-support in its lowered position are shown particularly in Figures 1 and 4. A hook 40 is pivotally connected at 41 to each leg 28 and is of such shape, size and position as to allow it to encompass a pin 42 attached to a side 31 of the book-support, when the book-support is in its lowered position. By these means the book-support will be held in its closed position, when it and the typewriter to which it is attached are revolved rearwardly and downwardly as in the closing of a typewriter desk.

The downward, or folded, position of the book-support is limited by the abutment of the members 31, 31 upon a flange 28A of each leg 28.

Pivotally attached to one upturned edge 32 at 44 is a casing 45, capable of being revolved across the book-support. A revoluble shaft 46, having its bearings in the two ends of the casing 45 carries a fixedly attached roller 47. A tension roller 48 is revoluble upon a bearing formed by the angular arm 49 loosely carried by the shaft 46. Springs 50, 50 are attached to the casing at 51, 51 and abut upon the arm 49.

A rubber apron 52 extends around the roller 47 and the tension roller 48.

A pin 84, carried by the side of the casing 45, limits the movement of the tension roller 48, due to the action of the spring 50 during the open position of the casing.

The upturned edge 32 opposite the hinge 44 carries a spring hook 53 capable of locking the casing in a position across the book-support and a spring 54 throws the casing away from the book-support and around the hinge 44, when the hook 53 is released, the movement of the casing being limited by the stop 55 abutting upon the member 32.

Fixedly attached to the shaft 46 is a cylinder 56, the attachment being made by means of a spider 57 at each end thereof. A cord 58 is attached to the outwardly extended lug 59 of the cylinder 56 and is given one turn around the cylinder. A ratchet wheel 60 is fixedly attached to the shaft 46 and a pawl 61 is attached to the cylinder 56, engagement between the pawl 61 and the ratchet 60 being maintained by the spring 62. A spring 63 tends to revolve the cylinder 56 in a reverse direction from that caused by a pull upon the cord 58, this movement being limited by means described later. The cylinder carries the extended lug 64 to prevent the cord 58 from leaving the face of the cylinder 56, when the cylinder is revolved in its open position away from the book-support.

Pivotally attached at 65 to the binding member element 21 is a finger-bar 66. The inner extremity of the finger-bar 66 extends beyond and below an arm 67 pivoted at 68 to the binding member element 20. The other extremity of the arm 67 is attached to the rod 69, which is attached to the rod 70, which, in turn, is attached to the cord 58, the joint between the rods 69 and 70 being so positioned as to allow them to be folded at this point when the book-support is folded forwardly as explained above. A stop 71 limits the downward movement of the free end of the arm 67, thus limiting the spring movement of the cylinder 56. The limit of the downward movement of the link 58, 70, 69 is controlled by the screw 72, upon which the arm 67 rests in its lowest position.

A book-carrier comprises a sheet of metal 73 having recesses 74, 74, capable of receiving the extended lugs 75, 75 of the plate 33 of the book-support. Two annular bearings 76, 77 are carried by the upper edge of the sheet 73. An angular U-shaped rod 78 is carried by and revoluble in the bearing 76, the spring 79 abutting upon the bearing and the pin 80 of the rod 78, allowing the rod to be slidably moved within the bearing. A revoluble angular U-shaped rod 81 is carried by the bearing 77.

The operation of the device is as follows:—

The book-carrier is removed from the device and a stenographic note-book laid thereon and attached thereto by placing the arms 78 and 81 between the leaves, preferably about midway of the book.

The casing 45 is then thrown open, as shown in dotted lines in Figure 11, and the book-carrier carrying the book is placed upon the plate 33 of the book-supporting member, the recesses 74, 74 of the book-carrier receiving the lugs 75, 75 of the plate 33, thus holding the book-carrier and the book in place.

The casing 45 is then closed over the book-carrier, the leaves 82 of the book which it is not desired to use being thrown over the back of the device, the leaves 83 to be used being positioned forwardly of the book-carrier. Figures 1 and 8 illustrate the device when in this position. The spring 50 causes the rubber apron around the tension roller 48 to press firmly against the upper portion of the outside leaf 83.

When it is desired to turn a leaf, the outer end of the finger arm 66 is pressed downwardly, operating the arm 67 and causing a downward movement of the links 69, 70, 58, revolving the cylinder 56 through the medium of the pawl 61 and ratchet 60. This revolves the roller 47, which through the medium of the rubber apron 52 revolves the tension roller 48, which, as it abuts upon the outer leaf 83 during its revolution, causes the latter to move upwardly and fall over the back of the device, thus exposing the next sheet 83 to view. When pressure upon the finger arm 66 is released, the spring 63 carries the cylinder 56 and its link and arm attachments back to their original position.

The amount of page moved upwardly by a single movement of the finger arm 66 is governed by the screw 72. By adjusting this screw one way or the other, the extent of the angular motion of finger arm 66, due to its depression, may be regulated, so that the rotation of cylinder 56 will accordingly be more or less. The extent of the rotation of tension roller 48 may thus be adjusted at will, varying the feed of the note-book sheet against which this roller abuts, to suit the convenience of the operator.

In transcribing notes, it is not necessary, as a general rule, to move the sheet on the note-book one step forward for every line thus transcribed; although it is possible to do this by only slightly depressing finger arm 66 at each time. The general practice is rather to feed a few lines at a time, and even half a page at a time, leaving the copy stationary while the portion thus exposed is being transcribed. This method of feeding suits the great majority of operators best, so that quite frequently it is desirable to feed three to four inches of copy at one time, with a single stroke of arm 66.

It will be observed, that this is much more than the travel ordinarily and conveniently provided for a typewriter key, which only reaches about one inch, with a relatively large leverage. Even if the travel of the tip of finger arm 66 were extended to say one and a half inches, and its leverage reduced to say three inches, the angular motion of arm 66 would be about sixty degrees. Now, it is imperative, for the device to be practical, that the size of the feeding roller be relatively small, so that the device will not be too bulky, and especially so as to conceal as little part of the copy as possible; so that the feeding roller should be of one inch in diameter, or preferably less, and should therefore be able to turn one or more revolutions when the finger arm 66 is depressed.

This clearly indicates that it is of the utmost importance that suitable means be provided for multiplying the angular travel of the prime mover to a considerable extent, for the device to be able to answer its purpose without assuming prohibitive and impractical dimensions; since the interposing of mechanism between the finger arm and the feeding roller, whereby only an angular motion of the feeding roller, of a fractional character, is produced, limits the feeding capacity of the device, and considerably curtails its usefulness.

When it is desired to close the desk upon which the device and typewriter are fastened, the members 39, 39 are pressed together, thus allowing the book-support and its attached parts to be folded forwardly and downwardly over the typewriting machine and locked in this position by means of the hook 40 and the pin 42. The desk can then be closed, the rearward and downward movement of the machine not releasing the book-supporting device.

The movement of the exposed book-page can be accomplished directly by the tension roller 48 by removing the apron, or belt, 52 and revolubly connecting the tension roller 48 to the driving roller 47 by belts or any other well-known means suitable for this purpose.

It will be observed, that particular attention has been given to the way of holding the note-book in position, and to its rapid insertion or removal. These operations are facilitated by the use of the book-carrier 73, to which the book may be permanently attached, and which practically constitutes a detachable part of the device itself. This feature provides a metal to metal connection, which is easily operated, and which permits rapid insertion or removal of the note-book, with its plate attached, enhancing the efficiency of the device.

Incidentally, this plate or book-carrier, constitutes a stiff backing for the note-book, which greatly facilitates the writing of stenographic or other notes, and the holding of the book while thus writing; and this indirectly further increases the efficiency of the device, and constitutes an additional advantage.

The rapidity with which the book may be inserted in position, or removed therefrom, is also in great measure due to the book-support being fully exposed and free to receive the book-carrier, when the casing 45 is moved away from the front thereof. This end is most conveniently attained in the present case, by mounting one of the ends of the casing on a substantially vertical pivotal support, although it is obvious that other ways of detachably mounting the feed roller and its casing may be devised.

Another feature of this invention, which has considerable importance, is the possibility of placing the device behind the typewriting machine, exposing the copy to be transcribed, directly in front of the operator. This is obviously the most convenient position, as the one causing the least eye exertion; and owing to the construction of the device, it is possible to thus expose the copy in front of the operator, independently of the typewriting machine itself, securing the device on to the desk behind the typewriter. No demands are thus made on the frame of the typewriter as a means of support; all drilling or other mechanical operations attendant upon the mounting of an attachment on a typewriter are thus avoided, and, what is more important, the device may be standardized and used in connection with all makes of typewriters, simply by securing it in position by means of a few wood screws.

It will be seen from the above that the device of my invention can be attached to any typewriting machine; that it holds the book directly in front of the typist; that the pages of the book can be turned by a key depression and that it may be positioned in a folded condition for purposes of decreased space occupation.

I do not limit myself to the particular size, shape, number or arrangement of parts, as shown and described, as these are given simply as an example, whereby the device of my invention may be clearly described.

What I claim is:—

1. In a device of the character specified, in combination, a book-supporting member, a movable member abuttable upon and near the upper end only of the exposed portion of a page of a book carried by the book-support, means whereby a movement of the movable member will shift the page upon which it abuts a predetermined amount, thus bringing another part thereof in the operator's line of vision, and movable supporting means for said movable member whereby said movable member may be maintained in operative position, or moved away therefrom, exposing that part of the underlying surface which is normally concealed thereby.

2. In a device of the character specified, in combination, a book-supporting member, a movable member abuttable upon a page of a book carried by the book-support, a finger-arm the movement of which will move the movable member and the book-page upon which it abuts without a corresponding movement of the other book-pages, and a member pivotally mounted on said book-supporting member, carrying said movable member.

3. In a device of the character specified, in combination, a book-supporting member, means for removably retaining a book upon the book-support, a movable member means for abutting the movable member upon and near the upper end only of the exposed portions of a page of a book upon the book-supporting member, means for removing the movable member from said abutment entirely exposing the underlying surface and means for moving the abutting movable member causing the book-page upon which it rests to gradually shift by predetermined amounts, bringing succeeding portions thereof in the operator's line of vision, eventually exposing the next underlying book-page.

4. In a device of the character specified, in combination, a book-support, supporting means for supporting the book-support in an approximate upright position and pivotally attached thereto, means for maintaining the book-support in its upright position, means for maintaining the book-support in a definite position when revolved upon the pivotal connection, a movable member capable of abutment upon and near the upper end only of the exposed portion of a page of a book carried by the book-support, means for moving the abutting movable member causing the book-page upon which it rests to gradually shift by predetermined amounts bringing succeeding portions thereof in the operator's line of vision, eventually exposing the next underlying book-page, and movable supporting means for said movable member, whereby said movable member may be maintained in operative position, or moved away therefrom, entirely exposing the underlying surface.

5. In a device of the character specified, in combination, a book-support, supporting means for supporting the book-support in an approximate upright position and pivotally attached thereto, means for maintaining the book-support in its upright position, means for maintaining the book-support in a definite position when revolved upon the pivotal connection, a movable member capable of abutment upon and near the upper end only of the exposed portion of a page of the book carried by the book-support, means for moving the abutting movable member causing the book-page upon which it rests to gradually shift by predetermined amounts, bringing succeeding portions thereof in the operator's line of vision, eventually exposing the next underlying book-page movable supporting means for said movable member, whereby said movable member may be maintained in operative position or moved away therefrom, exposing that part of the underlying surface which is normally concealed thereby, and means for attaching the device to a typewriting machine.

6. In a device of the character specified, in combination, a book-support, supporting means for supporting the book-support in an approximate upright position, a plurality of rollers capable of placement across the face of a page of a book carried by the book-support, an endless belt connecting the rollers, means for abutting the belt upon the face of a book-page and means for moving the belt causing a movement of the abutting page and a corresponding exposure of the next underlying book-page.

7. In a device of the character specified, in combination, a book-support, supporting means for supporting the book-support in an approximate upright position and pivotally attached thereto, means for maintaining the book-support in its upright position, means for maintaining the book-support in a predetermined position when revolved upon the pivotal connection, a pivotal casing, a revoluble shaft carried by the casing, a driving roller fixedly attached to the shaft, a second shaft carried by the casing parallel to the first shaft, a tension roller carried by the second shaft, an endless belt encompassing the two rollers, means for maintaining the casing across the face of a book carried by the book-support the belt abutting upon the exposed page of the book and means for revolving the driving roller whereby the movement of the belt will move the book-page upon which it abuts.

8. In a device of the character specified, in combination, a book support, supporting means for supporting the book-support in an approximate upright position and pivotally attached thereto, means for maintaining the book-support in its upright position, means for maintaining the book-support in a predetermined position when revolved upon the pivotal connection, a pivotal casing, a revoluble shaft carried by the casing, a driving roller fixedly attached to the shaft, a second shaft carried by the casing parallel to the first shaft, a tension roller carried by the second shaft, an endless belt encompassing the two rollers, means for maintaining the casing across the face of a book carried by the book-support the belt abutting upon the exposed page of the book, means for removing the casing and its attached parts from across the face of the book, a link and arm system whereby the movement of an arm will cause the revolution of the driving roller moving the book-page upon which the belt abuts and exposing the next underlying book-page and means for attaching the device to a typewriting machine.

9. In a device of the character specified, in combination, a book-support, supporting means for supporting the book-support in an approximate upright position and pivotally attached thereto, means for maintaining the book-support in its upright position, means for maintaining the book-support in a predetermined position when revolved upon the pivotal connection, a pivotal casing, a revoluble shaft carried by the casing, a driving roller fixedly attached to the shaft, a second shaft carried by the casing parallel to the first shaft, a tension roller carried by the second shaft, an endless belt encompassing the two rollers, means for maintaining the casing across the face of a book carried by the book-support, the belt abutting upon the exposed page of the book, a shaft-moving member fixedly attached to the first shaft, a flexible member fixedly attached to the shaft-moving member, a movement of the flexible member causing a revolution of the shaft-moving member and a movement of the book-page upon which the belt abuts and means for revolving the shaft-moving member into its normal position when the flexible member is released.

10. In a device of the character specified, in combination, a book-support, supporting means for supporting the book-support in an approximate upright position and pivotally attached thereto, means for maintaining the book-support in its upright position, means for maintaining the book-support in a predetermined position when revolved upon the pivotal connection, a pivotal casing, a revoluble shaft carried by the casing, a driving roller fixedly attached to the shaft, a second shaft carried by the casing parallel to the first shaft, a tension roller carried by the second shaft, an endless belt encompassing the two rollers, means for maintaining the casing across the face of a book carried by the book-support the belt abutting upon the exposed page of the book, a cylindrical member fixedly attached to the first shaft, a flexible member fixedly attached to the cylindrical member and given at least a partial turn around the same, means for connecting the flexible member with an arm movement, means whereby the movement of an arm will cause a revoluble movement to the cylindrical member causing a movement of the exposed book-page and a corresponding exposure of the next underlying book-page.

11. In a device of the character specified, in combination, a book-support, supporting means for supporting the book-support in an approximate upright position and pivotally attached thereto, means for maintaining the book-support in its upright position, means for maintaining the book-support in a predetermined position when revolved upon the pivotal connection, a pivotal casing, a revoluble shaft carried by the casing, a driving roller fixedly attached to the shaft, a second shaft carried by the casing parallel to the first shaft, a tension roller carried by the second shaft, an endless belt encompassing the two rollers, means for maintaining the casing across the face of a book carried by the book-support, the belt abutting upon the exposed page of the book, a cylindrical member fixedly attached to the first shaft, a flexible member fixedly attached to the cylindrical member and given at least a partial turn around the same, a linked rod system attached to the flexible member, an arm movement attached to the rod system and means whereby the movement of an arm will move the exposed book-page a predetermined distance with a corresponding exposure of the next underlying book-page.

12. In a device of the character specified, in combination, a book-support, a book-carrying means capable of removable attachment to the book support, supporting means for supporting the book-support in an approximate upright position and pivotally attached thereto, means for maintaining the book-support in its upright position, means for maintaining the book-support in a predetermined position when revolved upon the pivotal connection, a pivotal casing, a revoluble shaft carried by the casing, a driving roller fixedly attached to the shaft, a second shaft carried by the casing parallel to the first shaft, a tension roller carried by the second shaft, an endless belt encompassing the two rollers, means for maintaining the casing across the face of a book carried by the book-support, the belt abutting upon the exposed page of the book, a cylindrical member fixedly attached to the first shaft, a flexible member fixedly attached to the cylindrical member and given at least a partial turn around the same means for maintaining the flexible member upon the cylindrical member, a linked rod system attached to the flexible member, an arm movement attached to the rod system, means whereby the movement of an arm will cause the revolution of the cylindrical member, means for limiting the revoluble movement of the cylindrical member, means for returning the cylindrical member to its normal position upon release of the arm and means for attaching the device to a typewriting machine.

13. In a device of the class described, the combination, with a copy-holder and a rotatable feeding member, of means for actuating said member in the feeding direction, a hand operated lever, a flexible connection between said lever and said actuating means, and means associated with said actuating means, for producing return motion of said actuating means and lever, independently of said feeding member.

14. In a device of the class described, the combination, with a copy-holder and a rotatable feeding member, of means for actuating said member in the feeding direction, a hand operated lever, a flexible connection between said lever and said actuating means, means associated with said actuating means, for producing return motion of said actuating means and lever, independently of said feeding member, and means for adjusting the angular motion of said lever.

15. In a device of the class described, the combination, with a copy-holder and a rotatable feeding member, of a pawl and ratchet device adapted to operate said feeding member in one direction, a hand operated lever, a flexible connection between said lever and said pawl and ratchet device, and means associated with said pawl and ratchet device, causing return motion of said lever and connection, independently of said feeding member.

16. In a device of the class described, the combination, with a book-support, of a sheet feeding member, a carrier therefor pivotally mounted on said book support, and a plate from which a note-book may be suspended, said plate being adapted to detachably interlock with said book-support.

17. In a device of the class described, the combination, with a book-support, of a sheet feeding member, a carrier therefor pivotally mounted on said book support, a book-carrier adapted to detachably interlock with said book-support, an operating lever, and means transmitting the motion thereof to said feeding member.

18. In a device of the class described, the combination, with a copy-holder and a feeding member, of means maintaining said feeding member under pressure against the surface of a sheet carried by said copy-holder, and movable supporting means, carrying said feeding member and pressure exerting means.

19. In a device of the class described, the combination, with a copy-holder and a rotatable feeding member, of a pawl and ratchet device adapted to operate said feeding member in one direction, said pawl and ratchet device comprising a drum member, an operating lever, a flexible element wound upon said drum member and attached to said lever, and a spring associated with said drum member, causing return motion of said drum member, independently of said feeding member.

20. In a device of the class described, the combination with a book support, of a book carrier onto which a note book may be attached, said book carrier being adapted to be inserted on or removed from said book support, a sheet feeding member, a carrier therefor movably mounted on said book support, and means for operating said feeding member.

21. In a device of the class described, the combination with a copy holder, of a feeding member abuttable upon a page of a sheet carried by said holder, said feeding member being movable away from said copy holder to permit easy insertion and removal of copy sheets, and means for retaining said feeding member in its detached position.

22. In a device of the class described, the combination with a copy holder, of a feeding member abuttable upon a page of a sheet carried by said holder, and carrying means for said feeding member movably mounted on said holder, said carrying means being adapted to be moved away from the surface thereof, to permit easy insertion and removal of copy sheets and means for retaining said feeding member in its detached position.

23. In a device of the class described, the combination with a copy holder, of a feeding member abuttable upon a page of a sheet carried by said holder, said feeding member being movable away from said holder to permit easy insertion and removal of copy sheets, means for retaining said feeding member in its operative position and means for moving said feeding member to and maintaining it in its inoperative position upon the releasing of said retaining means.

24. In a device of the class described, the combination with a copy holder, of a feeding member abuttable upon a page of a sheet carried by said holder, a carrier therefor movably mounted upon said holder, said carrier being movable away from the surface thereof, to permit easy insertion and removal of copy sheets, means for retaining said carrier in its operative position, and means for moving to and maintaining it in its inoperative position upon the releasing of said retaining means.

25. In a device of the class described, the combination with a copy holder, of a feeding member abuttable upon a page of a sheet carried by said holder, a carrier therefor movably mounted upon said holder, said carrier tending to remain in its inoperative position away from the surface of said holder, and releasable means for retaining said carrier in its operative position.

26. In a device of the class described, the combination with a copy holder, of a carrier movably mounted in relation to said holder, and a sheet feeding member mounted on and movable in relation to said carrier.

27. In a device of the class described the combination with a copy holder, of a carrier movable to operative or inoperative position, and a sheet feeding member mounted on said carrier, movable to and from the surface of said holder independently of said carrier.

28. In a device of the class described, the combination of a copy holder, a movable member, means for abutting the movable member upon a page of a sheet upon said holder, means for moving the abutting movable member causing shifting movement of the sheet engaged thereby, and means for removing the movable member from its operative to an inoperative position, said means being adapted to be set so as to retain said movable member in said inoperative position.

29. In a device of the class described, the combination with a copy holder, of a movable member abuttable upon a page of a sheet carried by said holder, means whereby a movement of the movable member will move a predetermined portion of the page upon which it abuts, and means for retaining said movable member in its operative position or in its inoperative position away from said holder to permit easy insertion on or removal of copy sheets from said holder.

30. In a device of the class described, the combination with a copy holder, of a rotatable sheet feeding member abuttable upon a page of a sheet carried by said holder, said rotatable member being adapted to be set in its operative position or in its inoperative position away from said holder to permit easy insertion on or removal of copy sheets from said holder and means for operating said feeding member.

31. In a device of the class described, the combination with a copy holder of a rotatable feeding member abuttable upon a page of a sheet carried by said holder, an operating mechanism therefor, comprising a rotatable element and means for transmitting the rotation of said rotatable element, to said rotatable member at an increased angular ratio.

32. In a device of the class described, the combination with a copy holder, of a feeding member abuttable upon a page of a sheet carried by said holder, said feeding member being movable away from said copy holder to permit easy insertion and removal of copy sheets, and lever actuated means, independent of the operation of the carriage of the typewriter served by said device for operating said feeding member in the feeding direction.

33. In a device of the class described, the combination with a copy holder, of a feeding member abuttable upon a page of a sheet carried by said holder, said feeding member being movable away from said copy holder to permit easy insertion and removal of copy sheets, and means under the control of the operator extending to the front of said device operatively associated with and actuating said feeding member in the feeding direction.

34. In a device of the class described, the combination with a copy holder, of a feeding member abuttable upon a page of a sheet carried by said holder, means for pivotally mounting said feeding member on and transversely of said holder and lever actuated means independent of the operation of the carriage of the typewriter served by said device for operating said feeding member in the feeding direction.

35. In a device of the class described, the combination with a copy holder, of a feeding member abuttable upon a page of a sheet carried by said holder, carrying means for said feeding member movably mounted on said holder, said carrying means being adapted to be moved away from the surface thereof, to permit easy insertion and removal of copy sheets, and means under the control of the operator operatively associated with and actuating said feeding member.

36. In a device of the class described, the combination with a copy holder, of a feeding member abuttable upon and near the upper end only of the exposed portion of a page of a sheet carried by said holder, carrying means for said feeding member movably mounted on said holder, said carrying means being adapted to be moved away from the surface thereof, and means pressing said feeding member against said surface.

37. In a device of the class described, the combination with a copy holder, of a feeding member abuttable upon a page of a sheet carried by said holder, carrying means for said feeding member movably mounted on said holder, said carrying means being adapted to be moved away from the surface thereof, and a spring mounted on said carrier, pressing said feeding member against said surface.

38. In a device of the class described, the combination with a copy holder, of a rotatable feeding member abuttable upon a page of a sheet carried by said holder, a movable controlling member therefor, and operative connections between said controlling and said feeding member, said connections being capable of optionally producing an angular displacement of said feeding member of 180 degrees or more, for each operative stroke of said controlling member, said movable controlling member being independent of the operation of a typewriter served by said device.

39. In a device of the class described, the combination with a copy holder, of a rotatable feeding member abuttable upon a page of a sheet carried by said holder, a movable controlling member therefor extending to the front of said device, and operative connections between said controlling and said feeding member, said connections being capable of optionally producing an angular displacement of said feeding member of 180 degrees or more, for each operative stroke of said controlling member.

40. In a device of the class described, the combination with a copy holder, of a rotatable feeding member abuttable against a page of a sheet carried by said holder, said feeding member being movable away from said copy holder to permit easy insertion and removal of copy sheets, means under the control of the operator for operating said feeding member and a driving mechanism independent of the operation of a typewriter served by said device, interposed between said feeding and said operating member, said mechanism being operative when said operating means is moved in one direction, and being inoperative when said operating means is moved in the opposite direction.

41. In a device of the class described, the combination with a copy holder, of a rotatable feeding member abuttable against a page of a sheet carried by said holder, said feeding member being movable away from said copy holder to permit easy insertion and removal of copy sheets, means under the control of the operator for operating said feeding member and a driving mechanism independent of the operation of a typewriter served by said device, interposed between said feeding and said operating member, said mechanism comprising an angularly movable driving member adapted to rotate said feeding member when said driving member is moved in one direction, releasing the same when said driving member is moved in the opposite direction.

42. In a device of the class described, the combination with a copy holder, of a rotatable feeding member abuttable against a page of a sheet carried by said holder, one of said elements being movable away from the other to permit easy insertion and removal of copy sheets, means under the control of the operator for operating said feeding member and a driving mechanism independent of the operation of a typewriter served by said device, interposed between said feeding and said operating member, said mechanism comprising an angularly movable driving member adapted to rotate said feeding member when said driving member is moved in one direction, releasing the same when said driving member is moved in the opposite direction, and a flexible member actuating said angularly movable driving member.

43. In a device of the class described, the combination with a copy holder, of a rotatable feeding member abuttable upon a page of a sheet carried by said holder, one of said elements being movable away from the other to permit easy insertion and removal of copy sheets, a movable controlling member therefor, and operative connections between said controlling and said feeding member, said connections being capable of optionally producing an angular displacement of said feeding member of 180 degrees or more, for each operative stroke of said controlling member, said movable controlling member being independent of the operation of a typewriter served by said device.

44. In a device of the class described, the combination with a copy holder, of a rotatable feeding member abuttable upon a page of a sheet carried by said holder, a carrier therefor, pivotally mounted on and transversely of said holder, a driving member mounted independently of said feeding member, and operative connections between said driving and said feeding member.

45. In a device of the class described, the combination with a copy holder, of a rotatable feeding member abuttable upon a page of a sheet carried by said holder, a carrier therefor, pivotally mounted on and transversely of said holder, a driving member coaxial with the pivotal suspension of said carrier, and operative connections between said driving and said feeding member.

46. In a device of the class described, the combination with a copy holder, of a rotatable feeding member abuttable upon a page of a sheet carried by said holder, a shaft mounted on and transversely of said holder, a carrier for said feeding member pivotally mounted on said shaft, a driving member also mounted on said shaft, and operative connections between said driving and said feeding member.

47. In a device of the class described, the combination with a copy holder, of a rotatable feeding member abuttable upon a page of a sheet carried by said holder, a shaft mounted on and transversely of said holder, a carrier for said feeding member pivotally mounted on said shaft, a driving member also mounted on said shaft, operative connections between said driving and said feeding member, and means under the control of the operator for actuating said driving member.

48. In a device of the class described, the combination with a copy holder, of a rotatable feeding member abuttable upon a page of a sheet carried by said holder, a carrier therefor, pivotally mounted on and transversely of said holder, a rotatable driving member for driving said feeding member and flexible means under the control of the operator for actuating said driving member.

49. In a device of the class described, the combination with a copy holder, of a casing movably mounted on said holder, a rotatable feeding member abuttable upon a page of a sheet carried by said holder, a carrier therefor, pivotally mounted on horizontal pivots on said casing, a driving member also mounted on said casing, and operative connections between said driving and said feeding member.

50. In a device of the class described, the combination with a copy holder, of a casing movably mounted on said holder, a rotatable feeding member abuttable upon a page of a sheet carried by said holder, a carrier therefor pivotally mounted on horizontal pivots on said casing, a driving member also mounted on said casing, co-axial with said pivots, and operative connections between said driving and said feeding member.

51. In a device of the class described, the combination with a copy holder, of a casing movably mounted on said holder, a rotatable feeding member abuttable upon a page of a sheet carried by said holder, a horizontal shaft mounted on said casing, a carrier for said feeding member pivotally mounted on said shaft, a driving member for said feeding member also mounted on said shaft and operative connections between said driving and said feeding member.

52. In a device of the class described, the combination with a copy holder, of a casing movably mounted on said holder, a rotatable feeding member abuttable upon a page of a sheet carried by said holder, a horizontal shaft mounted on said casing, a carrier for said feeding member pivotally mounted on said shaft, a driving member for said feeding member also mounted on said shaft, operative connections between said driving and said feeding member, and flexible means under the control of the operator for actuating said driving member.

53. In a device of the class described, a holder for a copy sheet, a feeding member abutting against the surface thereof, a carrier for said feeding member movably mounted on said holder, an operating mechanism for said feeding member comprising a driving and a driven element mounted on said carrier, and means under the control of the operator actuating said mechanism.

54. In a device of the class described, a holder for a copy sheet, a feeding member abutting against the surface thereof, a carrier for said feeding member movably mounted on said holder, an operating mechanism for said feeding member comprising a driving and a driven element mounted on said carrier, and means under the control of the operator actuating said mechanism, said mechanism being operative when said driving element is moved in one direction and being inoperative when said driving element is moved in the opposite direction.

Signed at New York city, in the county of New York and State of New York this 29th day of June, 1922.

HARRY H. HARNSBERGER.